US012510557B2

(12) United States Patent
Jahnen et al.

(10) Patent No.: US 12,510,557 B2
(45) Date of Patent: Dec. 30, 2025

(54) DEVICE FOR ASCERTAINING DATA FOR DETERMINING A VELOCITY OF A VEHICLE, EVALUATION DEVICE, AND METHOD FOR THIS PURPOSE

(71) Applicant: K.W.H. Ciclosport Vertriebs GmbH, Gräfelfing (DE)

(72) Inventors: Georg Jahnen, Gräfelfing (DE); Christian Becker, Gräfelfing (DE)

(73) Assignee: K.W.H. Ciclosport Vertriebs GmbH, Gräfelfing (DE)

( * ) Notice: Subject to any disclaimer, the term of this patent is extended or adjusted under 35 U.S.C. 154(b) by 124 days.

(21) Appl. No.: 18/265,904

(22) PCT Filed: Dec. 10, 2021

(86) PCT No.: PCT/EP2021/085231
§ 371 (c)(1),
(2) Date: Jun. 7, 2023

(87) PCT Pub. No.: WO2022/135978
PCT Pub. Date: Jun. 30, 2022

(65) Prior Publication Data
US 2024/0110937 A1   Apr. 4, 2024

(30) Foreign Application Priority Data
Dec. 23, 2020 (EP) ..................... 20216895

(51) Int. Cl.
*G01P 3/487* (2006.01)
(52) U.S. Cl.
CPC .................... *G01P 3/487* (2013.01)

(58) Field of Classification Search
CPC ...................................... G01P 3/487
See application file for complete search history.

(56) References Cited

U.S. PATENT DOCUMENTS

| 4,967,153 A | 10/1990 | Langley |
| 9,267,800 B2 | 2/2016 | Doutaz et al. |

(Continued)

FOREIGN PATENT DOCUMENTS

| DE | 102018210754 A1 * | 7/2019 |
| EP | 2073022 B1 | 8/2013 |

(Continued)

OTHER PUBLICATIONS

International Search Report of the International Searching Authority, issued in PCT/EP2021/085231, mailed Mar. 3, 2022; ISA/EP.

(Continued)

*Primary Examiner* — Reena Aurora
(74) *Attorney, Agent, or Firm* — HARNESS, DICKEY & PIERCE, P.L.C.

(57) ABSTRACT

The invention relates to a device for ascertaining data for determining a velocity of a vehicle having a magnet, which is attachable to a wheel and executes a circular movement upon rotation of the wheel. Furthermore, a sensor unit is provided for recording signals due to the circular movement of the magnet. The sensor unit has at least one sensor for measuring a quantitative magnetic field strength change. In this case, the sensor is configured to sample the magnetic field strength change at a sampling frequency of at least 200 Hz. In addition, the invention relates to a method for ascertaining data for determining a velocity of a vehicle.

13 Claims, 3 Drawing Sheets

(56) References Cited

U.S. PATENT DOCUMENTS

2012/0310442 A1    12/2012  Doutaz et al.
2016/0209281 A1*    7/2016  Carrasco Vergara ... G01L 3/242

FOREIGN PATENT DOCUMENTS

EP          3435094  A2    1/2019
JP       2014160009  A     9/2014

OTHER PUBLICATIONS

International Preliminary Report on Patentability (in English) for corresponding International Application No. PCT/EP2021/085231 completed Nov. 14, 2022, 8 pages.
International Preliminary Report on Patentability (in German) for corresponding International Application No. PCT/EP2021/085231 completed Nov. 14, 2022, 20 pages.

* cited by examiner

DEVICE FOR ASCERTAINING DATA FOR DETERMINING A VELOCITY OF A VEHICLE, EVALUATION DEVICE, AND METHOD FOR THIS PURPOSE

FIELD

The invention relates to a device for ascertaining data for determining a velocity of a vehicle, for example a bicycle. Furthermore, the invention relates to an evaluation device for determining a velocity of a vehicle and to a method for this purpose.

SUMMARY

The present disclosure relates to an apparatus and method which forms a velocity sensor for bicycles. A magnet is attached to the wheel of the bicycle for this purpose. This is carried out in particular by an attachment to one of the spokes. Furthermore, a sensor unit is provided, which is fastened to the frame of the bicycle. A point is selected in this case past which the magnet moves during a revolution of the wheel. Conventional sensor units usually have a Reed contact. During a revolution of the wheel, the magnet is guided past the Reed contact, whereby it closes and an electrical circuit is thus briefly closed. An electrical pulse is thus generated. By measuring the time interval between pulses, the units of time $\Delta t$ per revolution of the wheel can be ascertained. If the circumference U of the wheel is also known, the velocity can be calculated based on these data:

$$v = U/\Delta t$$

wherein v is the ascertained velocity, U is the circumference of the wheel, and $\Delta t$ is the time interval between two pulses.

The Reed contact is typically connected via a 2-wire line to an evaluation device, which executes this evaluation and displays the velocity for example on a speedometer or passes on the signals via radio.

BACKGROUND

The manipulation protection of the velocity measurement for bicycles is becoming more and more important in conjunction with E-bikes, which are becoming more and more popular.

According to the German Road Traffic Act, for example, a motor assistance of the movement can only be carried out up to a velocity of 25 km/h. If pedelecs are used, this assistance can be provided up to 45 km/h.

To bypass these legal regulations, various methods as to how the velocity measurement can be manipulated are known. One possibility is to have false pulses sent to the circuit downstream from a Reed contact, a lower velocity can thus be suggested to a controller, in that the time intervals between two pulses are increased. The signals of the Reed contact are then completely suppressed.

In addition, other devices are also known, which are placed in front of the Reed contact, thus between it and the magnet, at the sensor unit. These devices either shield the magnetic field or the magnet is removed entirely. A magnetic field is applied to the Reed contact at time intervals via the additional device, so that the contact closes. This has the result that the corresponding pulses are generated and evaluated in the downstream evaluation. However, since there is no longer a relationship in reality with the closing of the Reed contact, the velocity can also be set arbitrarily here.

EP 3 435 094 and JP 2014 160009 A describe generic velocimeters that operate with a sensor. Other velocity meters that operate on a pulse basis are described in U.S. Pat. No. 9,267,800 B2, U.S. Pat. No. 4,967,153 A and EP 2 073 022 B1.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
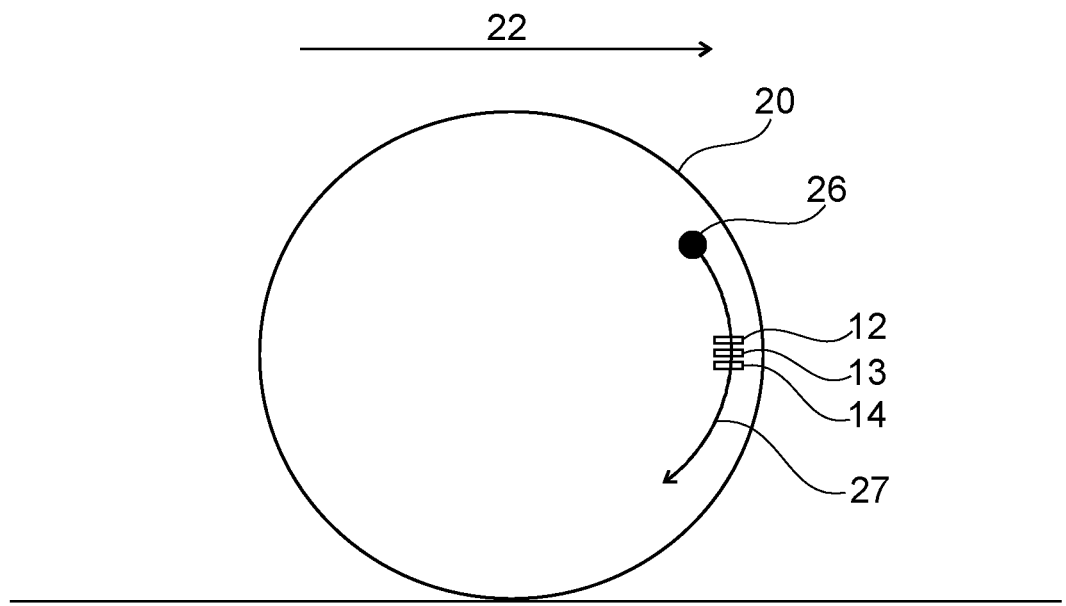
FIG. 1 shows a very schematic view of the underlying functional principle.

The invention is based on specifying a device and a method for ascertaining data for determining a velocity of a vehicle which is more secure from manipulation.

This object is achieved according to the invention defined in the appended claims.

Further advantageous embodiments are specified in the dependent claims, the description, and also in the figures and the description thereof.

According to claim 1, it is provided that a sensor unit has at least one sensor for measuring a quantitative magnetic field strength change and that the sensor is configured to sample the magnetic field strength change at a sampling frequency of at least 200 Hz.

The invention is based on the fundamental concept of providing a sensor other than a Reed sensor, which only indicates the presence or absence of a magnetic field. According to the invention, at least one sensor is provided which can ascertain and pass on a quantitative change of the magnetic field or its strength. Together with a sampling frequency of at least 200 Hz, multiple sampling values can thus be recorded during one passage of the magnet upon a revolution of the wheel.

This offers the advantage over conventional systems that a profile or a course of the magnetic field change is also sampled and thus recorded. If this profile is evaluated, a large number of the above-described manipulations can thus be detected and therefore suppressed.

Additionally, at least two sensors are provided for measuring a quantitative magnetic field strength change. According to the inventions these are arranged in the direction of the circular movement of the magnet when it is attached to the wheel. In other words, the sensors are arranged in such a way that the magnet is first guided past one sensor and subsequently past the other sensor. Of course, this can also be carried out using multiple sensors.

Ideally, the sensors are arranged so close to one another that the magnetic field of the magnet is measurable simultaneously by multiple sensors. The sensors then cannot be influenced independently of one another and thus manipulated.

Due to the increase of the number of the sensors for quantitatively recording the magnetic field strength change, the available information about the magnet movement which can be supplied to an evaluation increases. This in turn facilitates the recognition of manipulations, since, on the one hand, the recorded data from different sensors can be compared to one another. If the measurement regions of the sensors overlap, a further manipulation unit would then not only give a signal to one sensor, but also to the others, so that the combination of the signals from the sensors does not match with one another.

Various sensors can be used in principle to measure a quantitative magnetic field strength change. Hall sensors are preferably used for this purpose. Hall sensors can be constructed on the basis of semiconductors and/or an integrated circuit, so that they are very compact and occupy little space. This offers the advantage that, for example, two or four Hall sensors can be accommodated inside a sensor housing which is only a few millimetres or centimetres in size. In principle, however, other sensors can also be used for this purpose, which enable a corresponding quantitative evaluation of magnetic field changes at the required sampling frequency. It is essential for this purpose that multiple sampling values can be recorded during the passage of the magnet, which have a sufficiently accurate resolution to establish a change of the magnetic field. For this purpose, it is not sufficient to establish whether a magnetic field is present or not, but rather the increase and decrease of the respective magnetic field is to be established.

The device according to the invention can be used in an evaluation device for determining a velocity of a vehicle, in particular a bicycle. For this purpose, the evaluation device additionally has an evaluation unit for determining the velocity of the vehicle.

The evaluation unit is provided to analyse the data which are ascertained by means of the device according to the invention on the quantitative magnetic field strength change accordingly so that the travel velocity of the vehicle can be indicated.

For this purpose, the evaluation unit can evaluate, for example, the duration of a magnetic field strength change to determine the velocity. It is preferred for this purpose that the duration of the presence above a threshold value is used to determine the velocity. In other words, it is ascertained how long the magnet requires to pass by a sensor. Pass by is to be understood to mean that the magnet is guided past the sensor by the revolution of the wheel. The rotational velocity of the magnet can be determined via the duration. The velocity can in turn be ascertained therefrom in conjunction with a known circumference of the wheel.

If the magnet generates a measured value above the threshold value for a time $\Delta t$ (determined on the basis of the measured values) for a travel $\Delta u$ of the magnet path along the sensor, the velocity $v_S$ can thus be calculated as follows:

$$v_S = \frac{\Delta u}{\Delta t} \frac{U_R}{U_M}$$

with the circumference of the magnet path $U_M$ and the circumference of the wheel $U_R$. These variables are specified to the system as parameters.

It is also possible that the evaluation unit is designed to evaluate the chronological repetition rate of the magnetic field strength change to determine the velocity of the vehicle. Such an evaluation is essentially equivalent to the known evaluation for Reed contacts, since the rotational velocity is ascertained here. It is also possible in this case to ascertain the travel velocity of the vehicle based on these data in conjunction with the circumference of the wheel.

If the duration of a revolution is determined with T, the velocity $v_P$ is calculated with:

$$v_P = \frac{U_R}{T}$$

In another embodiment, the evaluation unit can be designed to ascertain the time interval $t_S$ of the signals of adjacent sensors to measure a quantitative magnetic field strength to determine the velocity of the vehicle. It is also preferred for this purpose to ascertain this distance for a threshold value to be set of the magnetic field strength. Based on the knowledge of the spatial distance $d_S$ of the two sensors from one another, the travel velocity of the wheel can thus in turn be ascertained. A calculation of the velocity is also possible here in conjunction with the known circumference $U_R$ of the wheel and $U_M$ of the magnet path.

$$v_M = \frac{d_s}{t_s} \frac{U_R}{U_M}$$

with the circumference of the magnet path $U_M$ and the circumference of the wheel $U_R$. These variables are specified to the system as parameters. It is to be noted that $t_s$ is signed, which also detects rotations of the wheel in the reverse direction.

In principle, combinations of the described methods can also be provided in the evaluation unit to further make the manipulation more difficult.

A further possibility for recognizing manipulations is if the evaluation unit is designed to compare the profile of the magnetic field change by means of a predefined target profile. In a first approximation, the target profile corresponds to the function:

$$f(t) = \frac{a}{\sqrt{1 + v_M^2 t^2}}$$

Figure 4:
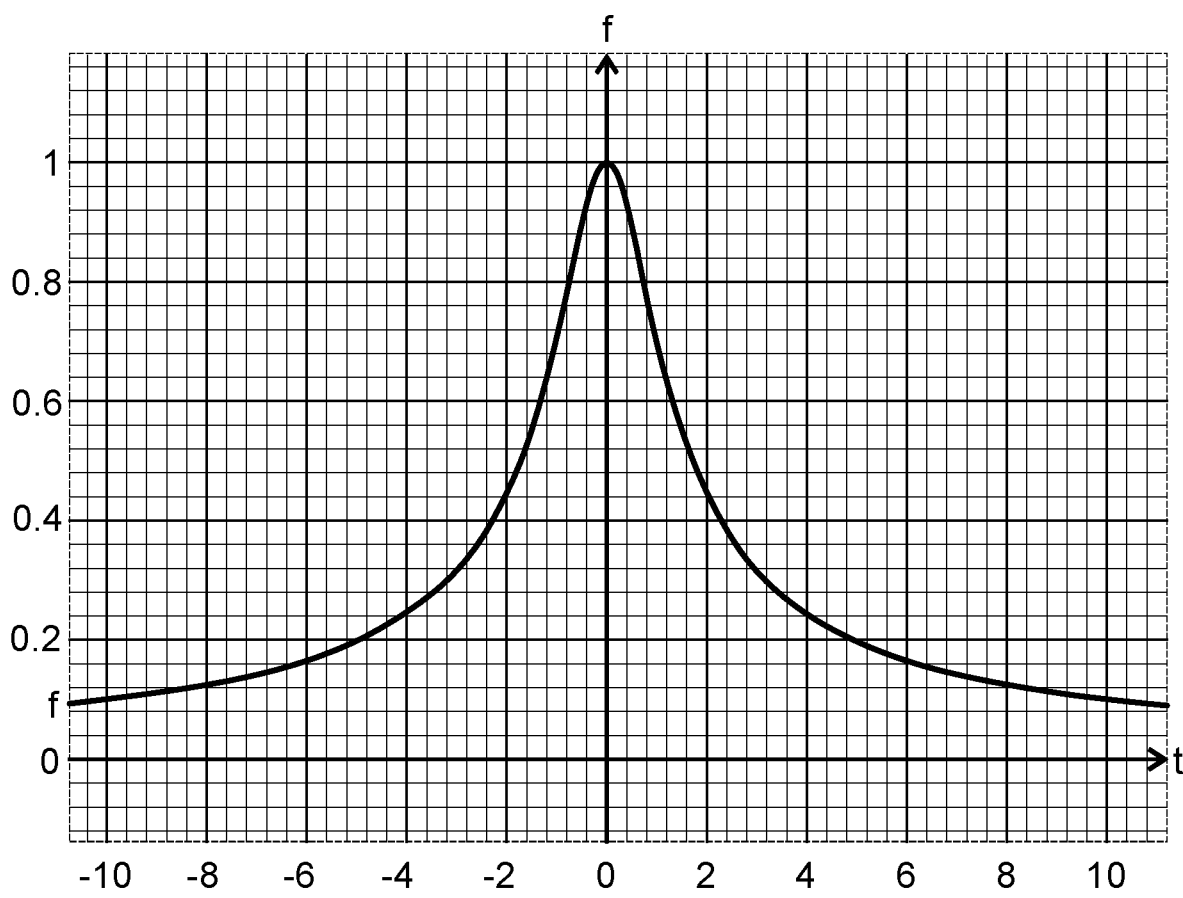
FIG. 4 shows an expected curve shape of the magnetic field strength.

This function is shown in FIG. 4 with the magnetic field strength for a=1 and v=1.

In this case a represents the amplitude and $v_M$ represents the magnet velocity. The parameters a and $v_M$ are then determined so that the mean square distance F between the measured values $s_t$ and f(t) is minimal. It can thus be established on the basis of the dimension of the mean square distance F, for example, that no magnet is present but rather a manipulation unit which actively generates a magnetic signal by means of an electromagnet. It can then be recognized by the analysis of the profile of the magnetic field strength change that it is not a magnet which is guided past but rather the magnetic field was generated in another way.

To further increase the security from manipulation, a data transfer between the device for ascertaining the data and the evaluation device can be designed to be secured, in particular encrypted. Additionally or optionally, the evaluation device can be configured to execute the data transfer to a downstream processing unit in a secured, in particular also encrypted manner. Such an embodiment ensures that, during the transfer of the signals or the data, a manipulation cannot be carried out subsequently. Simple digital encryptions or the like suggest themselves as the encryption for this purpose.

Furthermore, the invention relates to a method for ascertaining data for determining a velocity of a vehicle, in particular a bicycle, in which a magnet is attached to a wheel of the vehicle to execute a circular movement during rotation of the wheel. Furthermore, a sensor unit for recording signals caused by the circular movement of the magnet is fastened in or on a component of the vehicle past which the magnet moves. This has the result that when the wheel rotates, the magnet is guided past the sensor unit and thus generates a signal. The sensor unit is designed here in such a way that it carries out a quantitative measurement of the magnetic field strength change, wherein the measurement is carried out at a sampling frequency of at least 200 Hz.

It is essential for this purpose that there is a departure from known Hall sensors which can only perform a discrete measurement of a magnetic field and sensor units are used which can carry out a quantitative measurement of a magnetic field strength change.

In the scope of the invention, this is understood in particular to mean that specifically the strength of the magnetic field is ascertained, wherein it is sufficient for the invention if the change of this strength is ascertained. A sole presence/absence is not sufficient for this purpose. A quantitative specification of this strength or change is necessary.

To determine the velocity of the vehicle, the duration of a magnetic field strength change, in particular the duration of the presence above a threshold value, can be evaluated. In other words, the breadth of an amplitude of a magnetic field strength change is analysed. The revolution velocity of the magnet and, with knowledge of the circumference of the magnet path, that of the wheel can be ascertained via this. Based on this information, the velocity can thus be calculated in conjunction with the known circumference of the wheel.

Alternatively or additionally, if the sensor unit carries out quantitative measurements of the magnetic field strength change at at least two adjacent locations, which are arranged in the direction of the circular movement of the magnet, the time interval of these quantitative measurements can be used for an evaluation. The circumferential velocity of the wheel can also be ascertained in this case and the velocity can in turn be calculated based on the circumference.

A further possibility is to evaluate the chronological repetition rate of the magnetic field strength change to determine the velocity. Such a calculation takes place similarly to known calculations during velocity measurements with the aid of Reed sensors.

In order to recognize a manipulation, the profile of the magnetic field strength change can furthermore be analysed. An analysis can take place for this purpose, for example, in comparison to a target profile. The slope of the magnetic field strength change, its maximum, or the maximum of the magnetic field and its entire profile shape can also be analysed. If sharp edges are present, for example, it is thus to be presumed that the signal does not originate from a rotating magnet.

The invention is explained in more detail hereinafter on the basis of an exemplary embodiment and with reference to the schematic drawings.

The underlying functional principle of the device according to the invention is explained hereinafter with the aid of FIG. 1.

A wheel 20 is shown here, on which a magnet 26 is fastened. This wheel 20 is part of a vehicle which moves in the direction 22.

This movement in the direction 22 has the result that the magnet 26 executes a circular movement 27 around the centre point of the wheel 20. According to the invention, for example, three sensors 12, 13, 14 are arranged on the path of this circular movement 27. This arrangement is such that the magnet 26 moves sequentially past the sensors 12, 13, 14 during its circular movement 22. The magnetic field of the magnet is measurable simultaneously in multiple sensors during the movement past. The sensors 12, 13, 14 can be, for example, Hall sensors which can establish a magnetic field strength or a change of the magnetic field.

Figure 2:
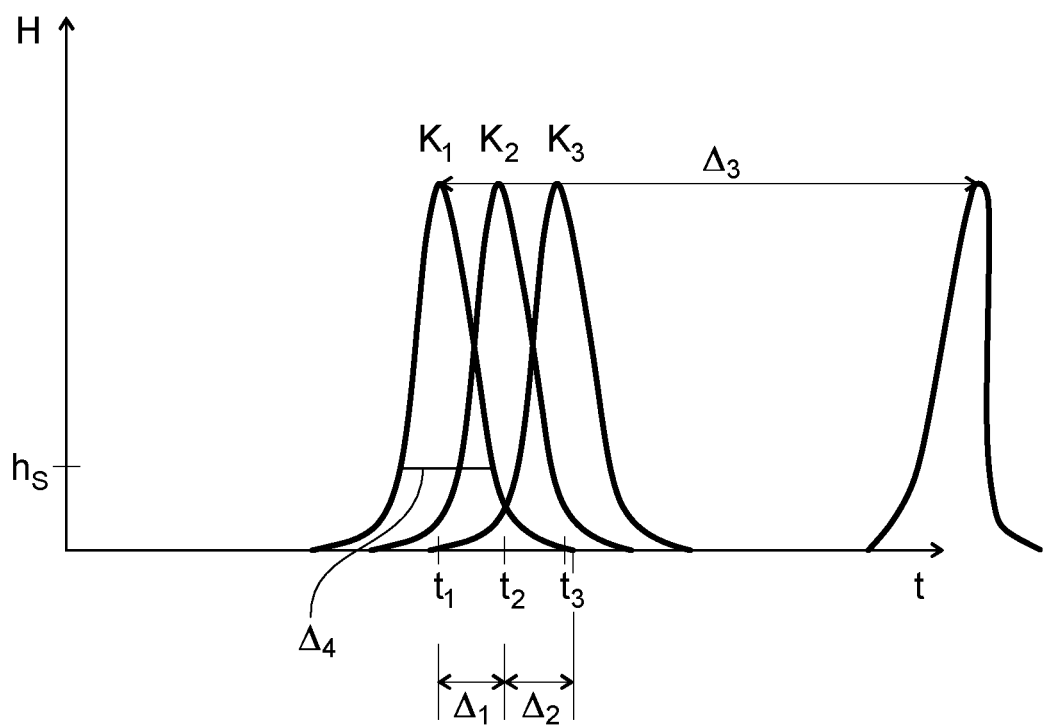
FIG. 2 shows an exemplary signal profile of the magnetic field change.

The data ascertained via the sensors 12, 13, 14 on the magnetic field are shown in simplified form by way of example in FIG. 2, as they are ascertained when the magnet 26 is guided past the sensors 12, 13, 14.

In this case, the respective magnetic field strength is plotted on the ordinate, whereas the abscissa represents the time curve.

Three curve profiles $k_1$, $k_2$, $k_3$ are shown in FIG. 2, which respectively originate from the sensors 12, 13, 14. As can be seen, due to the high sampling rate according to the invention, an exact profile of the strength of the magnetic field and thus also its change is shown in each curve $k_1$, $k_2$, $k_3$.

According to the invention, these data can be evaluated differently to calculate the rotational velocity and thus, via a known circumference of the wheel 20, also the velocity of the vehicle.

One possibility is to use the chronological extension $\Delta 4$ of a curve $k_1$ over a certain threshold value $h_s$ for ascertaining the rotational or circumferential velocity of the magnet. This chronological extension $\Delta 4$ changes with the velocity at which the magnet is guided past the corresponding sensor 12. In other words, the velocity of the magnet 26 itself can be determined. If this is carried out not only for the curve $k_1$ but also for the curves $k_2$ and $k_3$, a manipulation can be minimized, since more data can be used for the same evaluation. The data for various threshold values can also be used.

A further possibility is to evaluate the time interval $\Delta 1$, $\Delta 2$ of certain points of the curves $k_1$, $k_2$, $k_3$. The velocity of the magnet 26 on the wheel 20 can also be concluded via this.

In a further embodiment, it is possible to ascertain the time interval $\Delta 3$ between two maxima of the same curve $k_1$. Via this, the time can be determined which is required so that the magnet is guided once past the same sensor 12 again. By means of this time, it is possible to also ascertain the velocity in conjunction with a known circumference of the wheel 20.

Of course, a combination of the evaluations described here can also be carried out. This is preferred to increase the manipulation protection.

A further possibility for establishing a manipulation is to also evaluate the curve profile itself. The continuity of the curve profile, the respective slope, a comparison of the slope of various curves $k_1$, $k_2$, $k_3$ to one another, or also the comparison to an ideal target curve value can be listed for this purpose, for example.

In this way, many manipulations, for example, using electromagnets which replace the magnet 26, or other artificial magnetic fields can be recognized.

Figure 3:
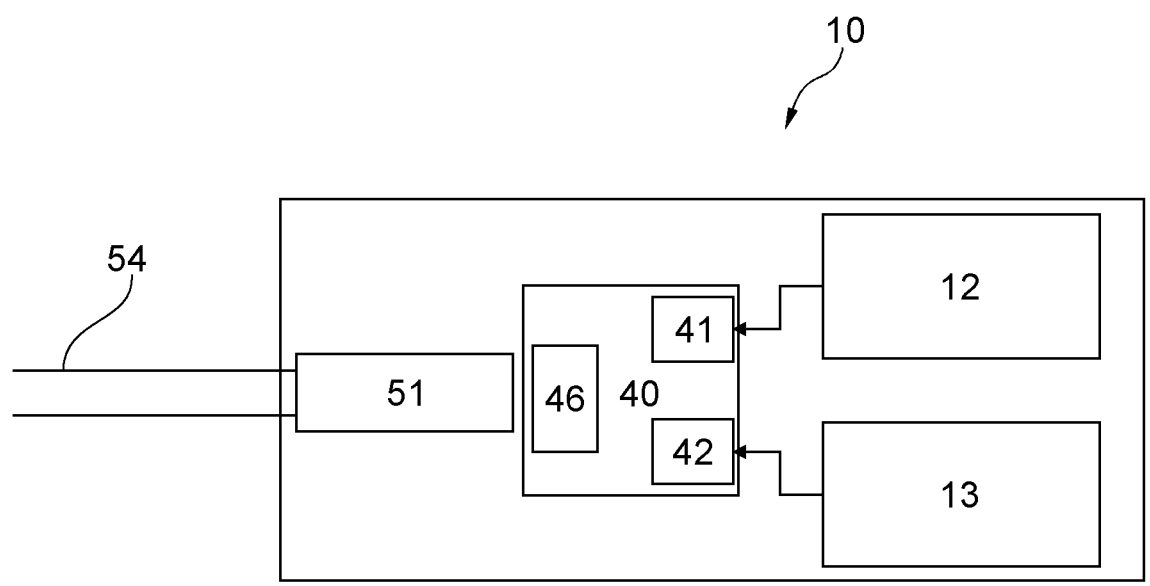
FIG. 3 shows a simplified structure of a sensor unit of the device according to the invention.

A very simplified representation of a sensor unit according to the invention is described hereinafter with reference to FIG. 3.

The sensor unit 10 shown here has two sensors 12 and 13. A microprocessor 40, which has two A/D converters 41 and 42, is arranged centrally on the sensor unit 10. These converters are used to digitize the signals which are from the two sensors 12, 13, which are designed as Hall sensors. Furthermore, the microprocessor 40 has an input and output 46, which is coupled to a corresponding interface 51. The interface 51 is connected to a 2-wire line 54, which is used, on the one hand, for the power supply and, on the other hand, also for the signal transfer for a sensor unit 10.

On the one hand, the above-described evaluations for the velocity can be carried out in the microprocessor 40. On the other hand, however, it is also possible to solely digitize the data, process them in a certain way, and transfer them via the interfaces 46, 51 via the 2-wire line 54 to a downstream evaluation unit.

To further secure this data transfer, it can be provided that this transfer via the 2-wire line 54 is carried out, for example, in an encrypted manner or coded in another manner, so that the signals cannot be exchanged on the line itself.

It is thus possible using the device according to the invention and the method according to the invention for ascertaining data for determining a velocity of a vehicle to ascertain these data in such a way that a manipulation can be substantially precluded.

The invention claimed is:

1. An apparatus for determining a velocity of a vehicle, wherein the vehicle is adapted to transport an individual and has at least one wheel, the apparatus comprising:
   a magnet, which is adapted to be attached to the wheel and which carries out a circular movement upon rotation of the wheel;
   a sensor unit for recording signals, caused by the circular movement of the magnet, wherein the sensor unit is configured to be fastened on a component of the vehicle past which the magnet moves;
   the sensor unit having at least one sensor configured to measure a magnetic field strength and/or a magnetic field strength change, and the sensor further being configured to sample the magnetic field strength change at a sampling frequency of at least 200 Hz, in that at least two sensors are provided on the wheel for measuring a magnetic field strength and/or a magnetic field strength change; and in that the at least two sensors for measuring a magnetic field strength and/or a magnetic field strength change are arranged in a direction of the circular movement of the magnet, and outputs from the at least two sensors relating to at least the magnetic field strength and/or the magnetic field strength change are used to determine the velocity of the at least one wheel.

2. The apparatus according to claim 1, wherein the sensors for measuring a magnetic field strength and/or a magnetic field strength change comprise at least one Hall sensor.

3. The apparatus according to claim 1, further comprising:
   an evaluation device for determining a velocity of the vehicle, and
   an evaluation unit for determining the velocity of the vehicle based on data ($k_1$, $k_2$ $k_3$) of a magnetic field strength and/or a magnetic field strength change.

4. The apparatus according to claim 3, wherein:
   the evaluation unit is designed to analyse a duration $\Delta 4$ of a magnetic field strength change, and in particular the duration of a presence of the magnetic field strength change above a threshold value ($h_s$), to determine the velocity.

5. The apparatus according to claim 3, wherein the evaluation unit is designed to analyse a time interval of the data $\Delta 1$, $\Delta 2$ of two adjacent sensors to measure the magnetic field strength and/or the magnetic field strength change to determine the velocity of the vehicle.

6. The apparatus according to claim 3, wherein the evaluation unit is designed to evaluate a chronological repetition rate of the magnetic field strength change to determine the velocity of the vehicle.

7. The apparatus according to claim 3, wherein the evaluation unit is designed to compare a profile ($k_1$, $k_2$ $k_3$) of the magnetic field strength change by means of a predefined target profile to detect manipulations.

8. The apparatus according to claim 3, wherein a data transfer between the device for ascertaining the data and the evaluation device is designed to be secured, in particular encrypted, and/or in that the evaluation device is configured to execute a data transfer to a downstream processing unit in a secured and encrypted manner.

9. The apparatus of claim 1, further comprising the vehicle.

10. A method for ascertaining data for determining a velocity of a vehicle adapted for transporting individuals, the vehicle having at least one wheel and a magnet attached to the wheel to execute a circular movement during rotation of the wheel, and a sensor unit secured to a component of the vehicle for recording signals caused by circular movement of the magnet as the magnet moves past the sensor unit as the wheel rotates, the sensor unit having at least two sensors for measuring a magnetic field strength and/or a magnetic field strength change the method comprising:
    determining a magnetic field strength and/or a measurement of the magnetic field strength change by means of the sensor unit;
    the measurement being carried out at a sampling frequency of at least 200 Hz, and
    wherein the at least two sensors for measuring a magnetic field strength and/or a magnetic field strength change are arranged in a direction of the circular movement of the magnet when it is attached to the wheel;
    the sensor unit carries out at least two measurements of the magnetic field strength and/or the magnetic field strength change at adjacent locations which are arranged in the direction of the circular movement of the magnet and
    in that, to determine the velocity of the vehicle, time intervals $\Delta 1$, $\Delta 2$ of the at least two measurements of the magnetic field strength and/or the magnetic field strength change are evaluated.

11. The method according to claim 10, wherein, to determine the velocity of the vehicle, a duration of a magnetic field strength change, in particular a duration $\Delta 4$ of a presence of the magnetic field strength above a threshold value ($h_s$), is evaluated.

12. The method according to claim 10, wherein a repetition rate of the magnetic field strength change is evaluated by analysing a slope of a magnetic field strength, as the magnetic field strength changes during rotation of the wheel, to determine the velocity.

13. The method according to claim 10, wherein a profile of the magnetic field strength change produced by rotation of the wheel is analysed against a target profile to recognize a manipulation.

* * * * *